United States Patent
Celisse et al.

(10) Patent No.: US 7,582,983 B2
(45) Date of Patent: Sep. 1, 2009

(54) METHOD OF CONTROLLING THE OPERATION OF AN ELECTRICAL MACHINE FORMING THE STARTER OF A HEAT ENGINE AND OF ELECTRICAL EQUIPMENT

(75) Inventors: Arnaud Celisse, Paris (FR); Jean-Emmanuel Guy, Le Chesnay (FR); Herve Klein, Levallois Perret (FR); Guillaume Levasseur, Nanterre (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 215 days.

(21) Appl. No.: 11/574,404

(22) PCT Filed: Aug. 10, 2005

(86) PCT No.: PCT/FR2005/050670
§ 371 (c)(1), (2), (4) Date: Feb. 27, 2007

(87) PCT Pub. No.: WO2006/027516
PCT Pub. Date: Mar. 16, 2006

(65) Prior Publication Data
US 2007/0233358 A1    Oct. 4, 2007

(30) Foreign Application Priority Data
Aug. 27, 2004 (FR) .................................. 04 51924

(51) Int. Cl.
*B60L 1/00* (2006.01)
(52) U.S. Cl. ........................................ 307/9.1
(58) Field of Classification Search ............ 307/9.1
See application file for complete search history.

(56) References Cited

U.S. PATENT DOCUMENTS

| 6,032,632 | A | 3/2000 | Bolenz et al. |
| 6,176,810 | B1 | 1/2001 | Eschrich et al. |
| 6,836,718 | B2* | 12/2004 | Hasfjord et al. ........ 701/54 |
| 7,157,806 | B2* | 1/2007 | Jabaji et al. ........... 307/9.1 |
| 2003/0151307 | A1 | 8/2003 | Klinger et al. |

FOREIGN PATENT DOCUMENTS

| EP | 0601300 A | 6/1994 |
| EP | 1104075 A | 5/2001 |
| JP | 01309826 A | 12/1989 |

OTHER PUBLICATIONS

International Search Report mailed Dec. 12, 2005 in PCT/FR2005/050670.

* cited by examiner

*Primary Examiner*—Robert L. DeBeradinis
(74) *Attorney, Agent, or Firm*—Nicolas E. Seckel

(57) ABSTRACT

The invention relates to a method of controlling the operation of an electrical machine forming the starter (8) of a heat engine (2) and of electrical equipment (13). According to the invention, the starter and the electrical equipment are powered by the same power source (9) with which the operation of the starter (8) and the operation of the electrical equipment (13) are controlled respectively after an operation request phase has been identified and provided that no pre-determined conditions oppose same. The invention is characterised in that the operation of the starter (8) constitutes a condition which opposes the simultaneous operation of the equipment (13).

11 Claims, 3 Drawing Sheets

METHOD OF CONTROLLING THE OPERATION OF AN ELECTRICAL MACHINE FORMING THE STARTER OF A HEAT ENGINE AND OF ELECTRICAL EQUIPMENT

The present invention concerns a method of controlling the automatic stopping and starting of a heat engine with which a motor or road vehicle is equipped.

The present invention concerns more particularly the arbitration between the control of the starting of the heat engine and the actuation of another equipment of the vehicle.

Manufacturers of vehicles equipped with heat engines, such as motor or road vehicles, are always seeking technical solutions likely to reduce the consumption and the emissions of pollutants of these engines.

Among the various solutions developed to this day, a system has been proposed that triggers the automatic stopping of the engine in all the phases of use of the vehicle in which the operation of the engine is not necessary, such as the phases in which the vehicle is temporarily stopped and in which the engine keeps idling anyway, then performs the automatic starting of the engine when the driver wishes to have the vehicle start off again.

This solution of automatic stopping and starting of the engines, also called by Anglo-Saxons "Stop and Start" or "Stop and Go," has an important potential for reduction of the consumption of the engines because it is estimated that, on average, for a given journey, a vehicle is stopped with the engine in idle for about 20% of the time.

A "Stop and Start" system comprises generally a computer to control automatically the stopping and starting of the heat engine from appropriate information on the operation of the vehicle. This computer comprises notably means adapted to identify an engine stop request phase, means adapted to identify an engine stop authorization phase during which the stopping of the engine is actually possible, and means for performing the actual stopping of the engine if the conditions "vehicle in engine stop request phase" and "vehicle in engine stop authorization phase" are both met.

In the same manner, a "Stop and Start" system comprises notably means adapted to identify an engine start request phase, means adapted to identify an engine start authorization phase during which the starting of the engine is actually possible, and means for performing the actual starting of the engine if the conditions "vehicle in engine start request phase" and "vehicle in engine start authorization phase" are both met.

Any time period during which the driver indicates his or her desire to stop the engine of his or her vehicle is called "engine stop request phase," wherein the vehicle can be stopped or still moving. Such a desire to stop the engine can be characterized by various criteria, such as the operation of the brake pedal of the vehicle by the driver.

Any period during which the operation of the vehicle does not require the operation of the engine, and thus, authorizes its stopping, is called "engine stop authorization phase." The conditions of operation of the vehicle requiring the operation of the engine, and this, while the vehicle is in engine stop request phase, can concern the specific operation of an equipment of the vehicle as well as relate to the driving pleasure only. These conditions opposed to the stopping of the engine are characterized by various criteria such as, for example, the temperature of the engine cooling water lower than a predetermined threshold. Indeed, an engine must reach a certain temperature to operate in an optimal manner, so that it is not opportune to delay the temperature increase of the engine by stopping it too early after it has started.

Any time period during which the operation of the vehicle requires the starting of the engine is called "engine start request phase." The conditions of operation of the vehicle requiring such a start are inferred generally from the conditions opposed to the stopping of the engine.

Any period during which the operation of the engine does not prohibit the starting of the engine is called "engine start authorization phase." The conditions of operation opposed to a start can be linked, for example, to the opened or closed state of the clutch and/or to the state of the transmission, with a gear being engaged or not.

To perform the starting of a heat engine in the framework of a "Stop and Start" system, a specially adapted electrical machine called alternator-starter is generally used. This electrical machine acts both as an electric generator when it is driven by the heat engine and as an electric engine for starting the heat engine.

When this machine is in engine mode, i.e., starter, it removes a non-negligible energy from the on-board network of the vehicle generally supplied by a battery. This results in causing problems when another electrical equipment is actuated at the same time as a start control is triggered.

In order to avoid over-sizing the battery or limiting the times the engine is started, it has appeared important to the Applicant to develop an arbitration strategy when a start is controlled simultaneously with the actuation of an electrical equipment, and this especially since the actuation of the electrical equipment is of a short duration, such as, for example, an actuator for shifting gears in a robotized gear box.

A goal of the present invention is thus a control method adapted to perform an arbitration between a start control and the control of the actuation of an electrical equipment.

The method according to the invention concerns the control of the operation of an electrical machine forming starter of a heat engine and of an electrical equipment, the starter and the electrical equipment being supplied by a same source of energy, through which the operations of the starter and of the electrical equipment are controlled, respectively, after an operation request phase has been identified and provided that predetermined conditions are not opposed thereto.

According to the invention, the control method is characterized in that the operation of the starter constitutes a condition opposed to a simultaneous operation of the electrical equipment.

According to another characteristic of the control method object of the present invention, the control of the operation of the starter is opposed to the simultaneous operation of the equipment.

According to another characteristic of the control method object of the present invention, the operation of the equipment is opposed to the operation of the starter.

According to another characteristic of the control method object of the present invention, the equipment cooperates with the transmission system of the vehicle.

According to another characteristic of the control method object of the present invention, the operation of the equipment is possible after a predetermined time period following the identification of an operation request phase of the equipment only if no control of the operation of the starter has been identified during this time period.

According to another characteristic of the control method object of the present invention, if an operation control of the starter is not performed subsequent to the identification of an operation request phase of the equipment, then the operation of the starter is no longer authorized as long as the equipment has not ended its operation performed subsequent to said operation request phase.

According to another characteristic of the control method object of the present invention, the starter and the equipment cooperate each with a specific computer performing the identification of the corresponding operation request phases, these computers exchanging information with each other by means of an adapted link such as a bus.

According to another characteristic of the control method object of the present invention, the computer cooperating with the starter transmits to the computer cooperating with the equipment the information that an operation of the starter is controlled.

According to another characteristic of the control method object of the present invention, the computer cooperating with the equipment transmits to the computer cooperating with the starter the information that an operation request phase of the equipment has been identified and this, prior to any control of the equipment.

According to another characteristic of the control method object of the present invention, the predetermined time period after which the operation of the equipment remains possible is calibrated so as to take into account the transfer time of the information from one computer to the other and the processing time of said information.

The invention will be better understood by reading the following description, given by way of example only and made in reference to the annexed drawings in which.

Figure 1:
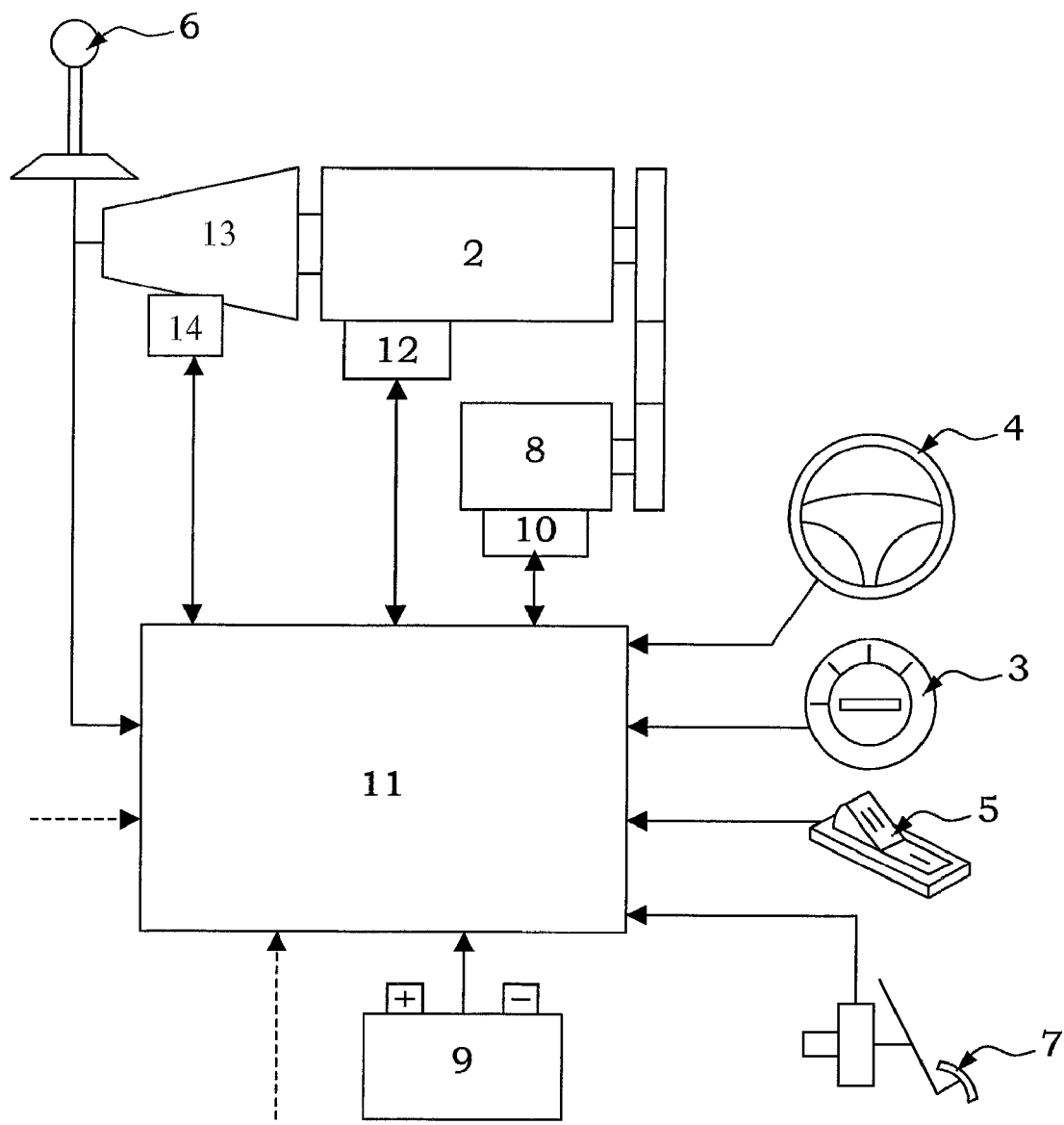
FIG. 1 is a view of a material architecture of the whole system for implementing the method according to the invention.

FIG. 1 shows various organs of a motor vehicle 1 equipped with a heat engine 2. In the passenger compartment of the vehicle, a switch 3 (with or without a key), disposed in the vicinity of the steering wheel 4, controls manually the starting and stopping of the engine 2, whereas means, such as a two-position switch 5 of the push button type, makes it possible for the driver to activate or inhibit the operation of the vehicle in the "Stop and Start" mode, i.e., in the automatic stopping and starting mode of the engine 2.

The vehicle comprises further a transmission mechanism of which a gear lever 6 is shown. The vehicle also has a braking device controlled notably by a brake pedal 7.

Of course, these equipments are not limitative of the other equipments of the vehicle which have not been shown, such as, in particular, a clutch, an engine cooling fan system to cool the engine 2, an air conditioning device to cool/heat the passenger compartment, a power steering mechanism, etc.

The heat engine 2 is a standard engine of the multi-cylinder type with controlled ignition or compression ignition (diesel). These types of engines are well known and will not be described in further details. The operation of the engine 2 is controlled in a standard manner by an engine control computer 12 that drives notably the fuel flow rate.

The engine 2 cooperates with appropriate starting means such as a reversible rotating electrical machine 8 forming alternator-starter. A transmission of movement, for example, via pulleys and belt, connects the rotor of the alternator-starter 8 to the crankshaft of the engine 2.

In a variant embodiment, the engine 2 can also cooperate with an additional starter, not shown, distinct from the alternator-starter 8.

The machine 8 makes it possible to transform a rotating movement of the inductor rotor, driven by the heat engine 2 of the vehicle, into an electric current induced in the coil windings of the stator. This current is then intended to supply electricity to the on-board network of the vehicle and to load the battery 9 of this vehicle.

The machine 8 can also constitute an electric motor or rotating electrical machine and drive in rotation, via the rotor shaft, the heat engine 2 of the vehicle. Thus, the alternator-starter 8 can start the heat engine 2 of the motor vehicle.

This machine 8, for example, of the polyphase type, operates thus as an alternator, notably to load the battery of the vehicle, and as a starter, to drive the internal combustion engine, also called heat engine, of the motor vehicle so as to start it. To this effect, a power unit connected to the phases of the armature of the alternator is used as a control bridge of these phases in motor mode and serves as a rectifier bridge when the alternator-starter 8 operates in alternator mode.

Such a machine 8 is well known in itself and will not be described in further details. The document FR2842041, for example, describes such a machine.

The system implementing the method for automatically controlling the stopping and starting of the engine according to the invention comprises a computer 11 that drives, via the computers 10 and 12, the operation of the machine 8 and the stopping and starting of the engine 2, and this, from a certain number of items of information concerning the operation of the vehicle.

Indeed, the computer 11 cooperates with appropriate information sensors adapted to supply, in addition to the position of the switch 3 or of the button 5, the required information on the operation of the vehicle, such as the rotation speed of the engine 2, the speed of the vehicle, the distance covered, the position of the clutch pedal, the position of the accelerator pedal, the position of the gear lever 6, the position of the brake pedal 7 and that of the hand brake, the gear set in the gear box, the temperature of the engine cooling water, the loading state of the battery 9, the state of the air conditioning, the torque applied to the steering wheel by the driver, etc.

It is important to notice that the computer 11 according to the present invention is defined in a more general way as being any system in which a control algorithm can be implanted using programming means and containing at least a memory. A programmable logic array of the ASIC type could be used. This computer 11 can be specific as illustrated or it can be integrated into another computer, such as, for example, the computers 10 or 12, or it can be integrated into several computers.

The computer 11 performs a constant monitoring of the operation of the vehicle from a certain number of items of information transmitted directly by appropriate sensors or via other computers to which the computer 11 is connected through a multiplexed bus and in particular the computers 14, 12, and 10, when the engine is rotating, it checks whether the vehicle is or is not in engine stop request phase and in engine stop authorization phase, and it infers therefrom the stopping of the engine. In the same manner, the engine being stopped, the computer 11 checks from the information received whether the vehicle is or is not in start request phase and in engine start authorization phase, and infers therefrom the starting of the engine.

The engine stop request phases are defined by appropriate vehicle operating criteria combining the fact that the button 5 is in "not inhibited" position and that notably one of the following criteria is observed:

the position of the brake pedal goes from "not pushed" to "pushed";

the gear lever is in neutral.

With respect to the engine start authorization phases, they are defined from a certain number of criteria identifying pre-defined vehicle operating conditions opposed to the stopping of the engine 2.

Different types of vehicle operating conditions likely to define these authorization phases can be distinguished:

conditions linked to the vehicle itself, such as the needs of the engine (water temperature, etc.), the needs for braking assistance, the needs of the on-board electrical network, the passenger compartment heating needs, etc.;

conditions linked to the driving pleasure, such as parking maneuvers, etc.;

conditions linked to the driver.

With respect to the start request phases, they are inferred substantially from the conditions opposed to the stopping of the engine.

Turning to the conditions opposed to the start requests, they comprise notably situations linked to the transmission, such as the existence of a gear being engaged.

Figure 2A:
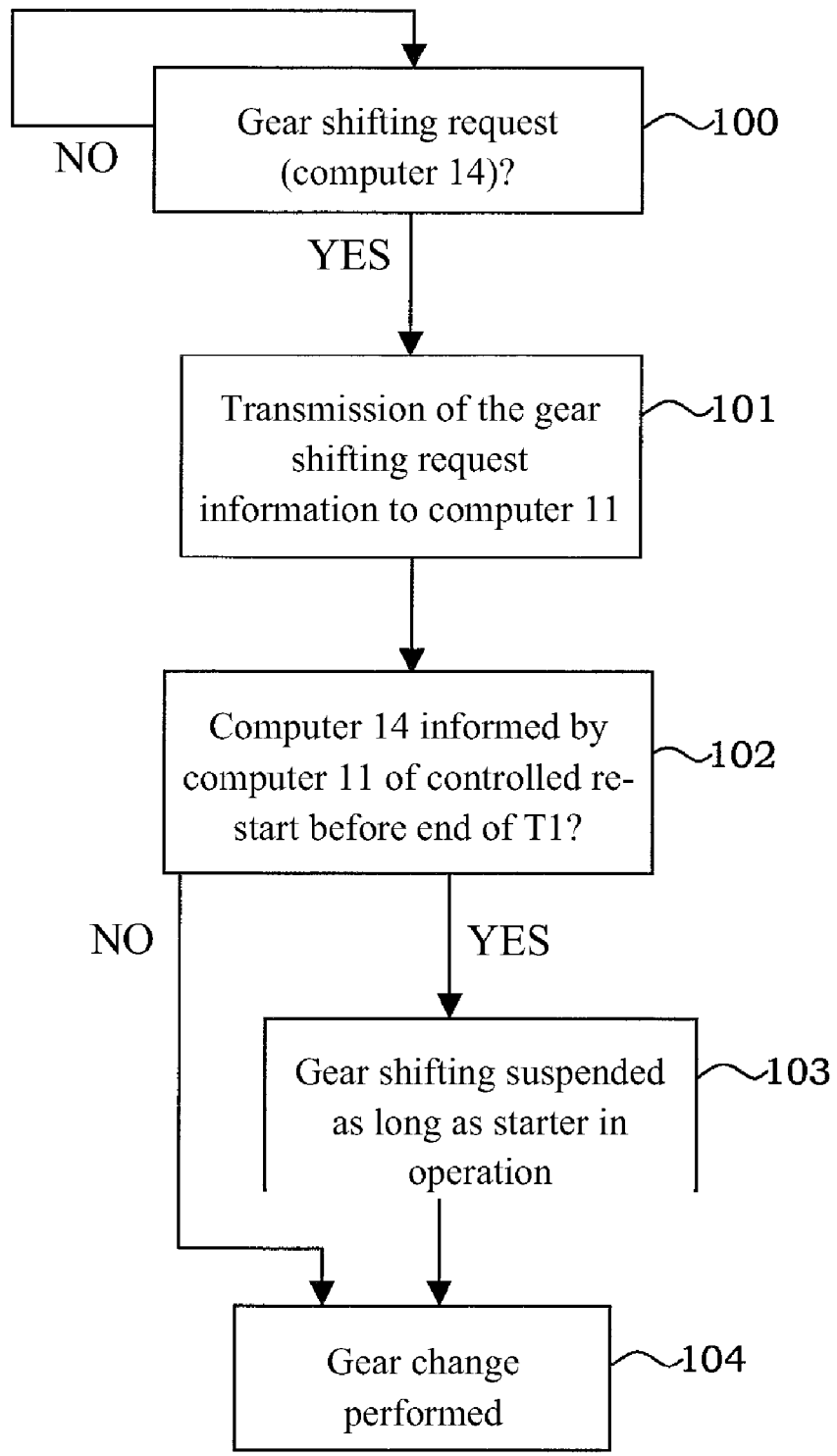
FIGS. 2a and 2b are schematic flow charts for implementing the method according to the invention.
Figure 2B:
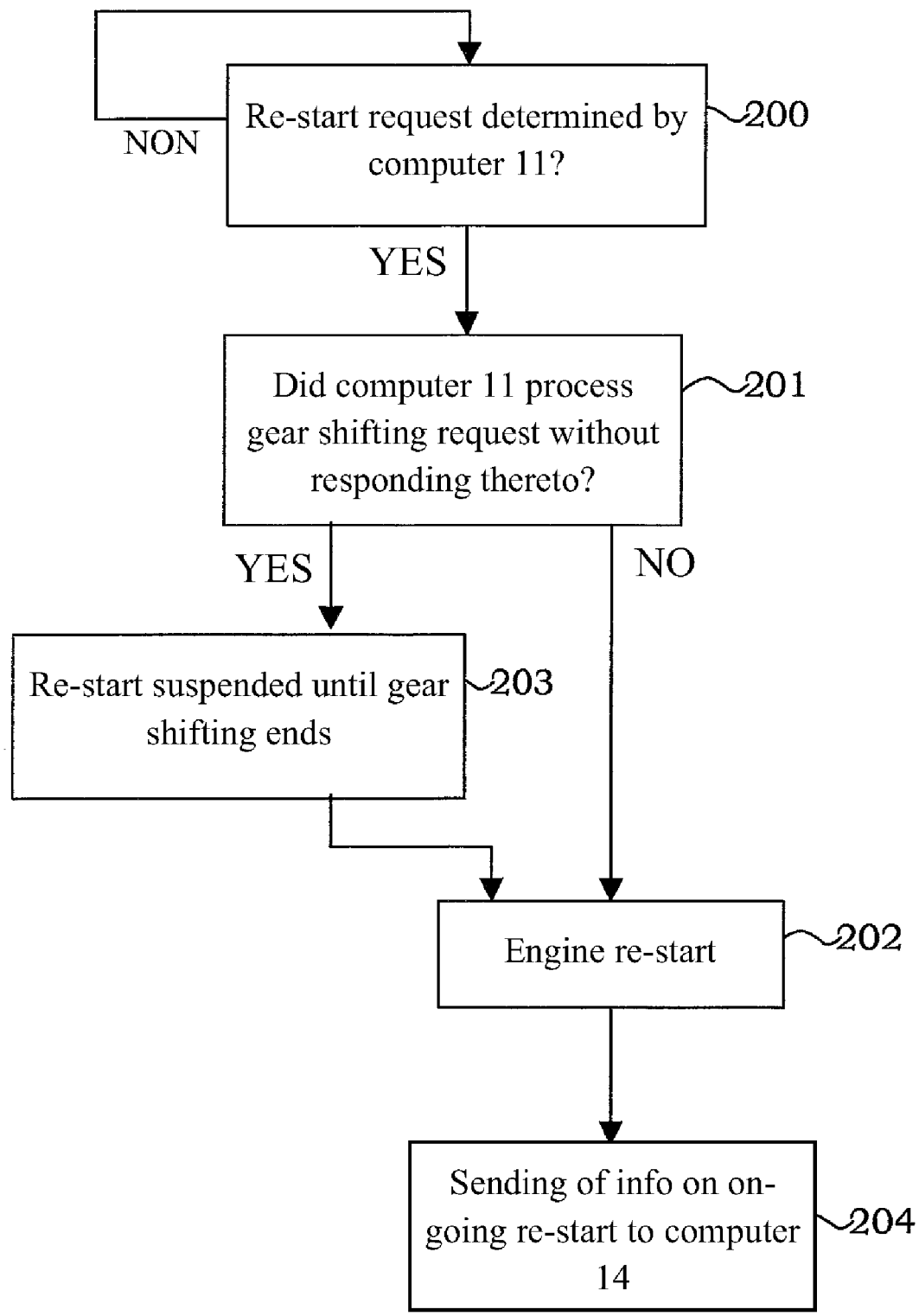

FIGS. 2a and 2b show schematic flow charts describing the algorithms followed by the computers 14 and 11, respectively, to perform the method according to the invention ensuring the arbitration between the actuation of the starting means of the engine 2 and the actuation of the robotized gear box 13 to perform a gear shifting so that the starter and the actuator of the gear shifting do not remove energy simultaneously from the battery 9.

Similarly to the control of the starter 8, a gear shifting of the robotized gear box 13 is driven by its computer 14 from the identification, during the step 100, of a gear shifting request phase and to the extent particular operating conditions of the vehicle are not opposed to such a gear shifting.

In accordance to the control method object of the present invention, as soon as the computer 14 identifies such a gear shifting request phase, it informs the computer 11 thereof, at step 101, and subsequently, at step 102, waits for the information stemming from the computer 11 according to which a start has been controlled.

Indeed, the computer 11 communicates systematically to the computer 14 the information according to which the starting of the engine, i.e., the actuation of the starter 8, is controlled, and this, as soon as this information has been determined by the computer 11.

The step 102 testing the reception of the information "starter controlled" is performed during a time period T1 whose calibrated value (for example, 60 ms) is sufficiently long to enable the computer 11 to receive the information "gear shifting request" stemming from the computer 14, to take into account this new event constituted by the gear shifting request and to determine whether this requires the control of the starting of the engine and to send back to the computer 14 the information according to which a start has been controlled.

If, before the end of the time period T1, the computer 11 informs the computer 14 that a start request is controlled, then the computer 14 suspends the requested gear shifting until it receives the information, at step 103, according to which the starter 8 has ceased being actuated, the engine having been started. When the starter 8 has ceased operating, the gear shifting is then performed at step 104.

If, at the end of the time period T1, the computer 14 has not received information according to which the computer 11 has decided to control the starter 8, then the computer 14 controls the operation of the robotized gear box to perform the requested gear shifting during step 104.

It must be noted that the delay T1 is more particularly required in-so-far as the architecture of communication between the computers does not make it possible for the computer 11 to send a specific information to the computer 14 according to which no start is controlled, and that, as a consequence, the gear shifting request can be satisfied, at least, with respect to this criteria. With such a system, the information according to which there is no start control is simply inferred from the non-reception of the contrary information (i.e., "start is controlled") in a given time period.

So that, if the architecture of communication makes it possible for the computer 11 to send a specific response to the computer 14 according to which no start is controlled, it is then no longer necessary to manage a delay T1. Indeed, it is sufficient in this case that the computer 14 wait for the response (positive or negative) of the computer 11 to its gear shifting request to then perform or suspend the gear shifting.

When the computer 11, after processing of the "gear shifting request" information that the computer 14 has sent to it, has responded that it does not control any start, or if it has not responded thereto, then a start can no longer be controlled by the computer 11 and this until the latter receives the information according to which the gear shifting has actually been performed by the robotized gear box 13.

Thus, during a step 200, the computer 11 determines whether there is a new start request phase. If such a phase occurs, then, at step 201, it checks if it has already processed a "gear shifting request" information and if it has not sent a response in return or answered in the negative.

If the response to the test 201 is negative, then it performs the control of the engine start at the step 202 if nothing is further opposed thereto.

If the response to the test 201 is positive, then it suspends the control of the starting and waits, step 203, until the gear shifting is finished. As soon as the gear shifting is performed, the start control is then triggered at the step 202. The start control being triggered, the computer then informs the computer 14 thereof at step 204.

Thus, according to the strategy described above, no simultaneous operation of the starter and of the gear shifting actuator is possible.

It must be noted that, depending on the arbitration selected, the starting of the engine is always a priority as compared to gear shifting.

Of course, the present invention is not limited to the particular embodiment described above, and thus, numerous changes or modifications can be made thereto without leaving the scope of the present invention.

Thus, the present invention aims at any situation where the starter is solicited at the same time as another important electrical consumer of the on-board network of the vehicle, and as a consequence, other electrical equipments can be concerned, and not just the robotized gear box 13.

The invention claimed is:

1. Method of controlling the operation of an electrical machine forming starter of a heat engine and of an electrical equipment, the starter and the electrical equipment being supplied by a same source of energy, through which the operations of said starter and of said electrical equipment are controlled, respectively, after an operation request phase has been identified and provided that predetermined conditions are not opposed thereto, wherein the operation of the starter constitutes a condition opposed to a simultaneous operation of said electrical equipment.

2. Control method according to claim 1, wherein the control of the operation of the starter is opposed to the simultaneous operation of said equipment.

3. Control method according to claim 1, wherein the operation of said equipment is opposed to the operation of said starter.

4. Control method according to claim 1, wherein said equipment cooperates with the transmission system of the vehicle.

5. Control method according to claim 1, wherein the operation of said equipment is possible after a predetermined time period following the identification of an operation request phase of said equipment and only if no control of the operation of the starter has been identified during said time period.

6. Control method according to claim 1, wherein, if a operation control of the starter is not performed subsequent to the identification of an operation request phase of said equipment, then the operation of said starter is no longer authorized as long as said equipment has not ended its operation performed subsequent to said operation request phase.

7. Control method according to claim 1, wherein said starter and said equipment cooperate each with a specific computer performing the identification of the corresponding operation request phases, said computers exchanging information with each other by means of an adapted link.

8. Control method according to claim 7, wherein the computer cooperating with the starter transmits to the computer cooperating with the equipment the information that an operation of the starter is controlled.

9. Control method according to claim 7, wherein the computer cooperating with the equipment transmits to the computer cooperating with the starter the information that an operation request phase of the equipment has been identified and this, prior to any control of said equipment.

10. Control method according to claim 7, wherein the operation of said equipment is possible after a predetermined time period following the identification of an operation request phase of said equipment and only if no control of the operation of the starter has been identified during said time period, and wherein said predetermined time period is calibrated so as to take into account the transfer time of the information from one computer to the other and the processing time of said information.

11. Control method according to claim 7, wherein the adapted link is a bus.

* * * * *